R. HECKSCHER.
Dumping-Wagon.
No. 27,049
Patented Feb 7, 1860
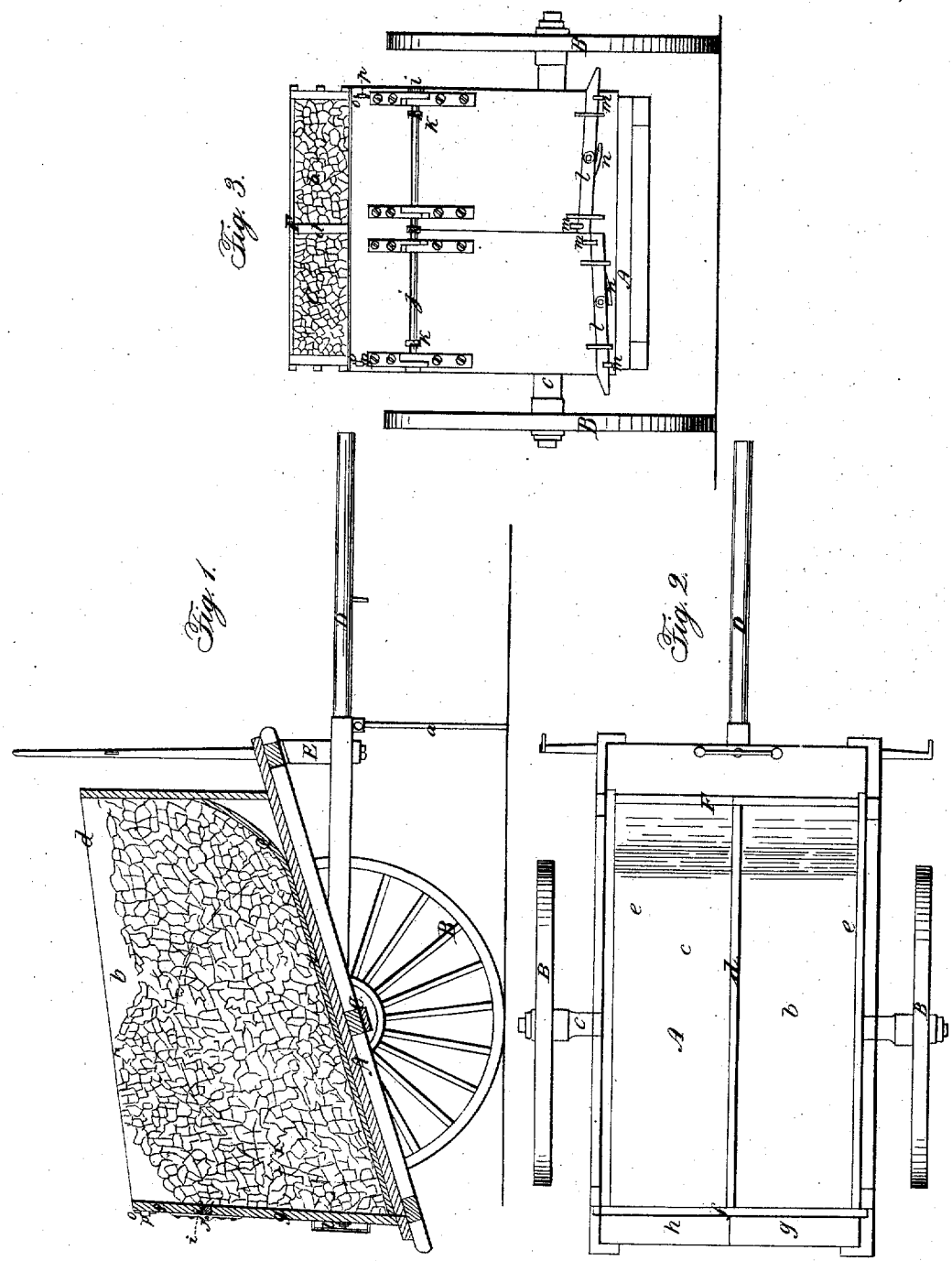
Witnesses:
Inventor:

UNITED STATES PATENT OFFICE.

R. HECKSCHER, OF NEW YORK, N. Y.

COAL-CART.

Specification of Letters Patent No. 27,049, dated February 7, 1860.

*To all whom it may concern:*

Be it known that I, R. HECKSCHER, of the city, county, and State of New York, have invented a new and Improved Coal-Cart; and I do hereby declare that the following is a full, clear, and exact description of the same, reference being had to the accompanying drawing, forming a part of this specification, in which—

Figure 1 represents a longitudinal vertical section of my invention. Fig. 2 is a plan or top view of the same. Fig. 3 is an end view of the same.

Similar letters of reference in the three views indicate corresponding parts.

The carts usually employed to convey coal from the yard to the different houses about the city or town are defective in many respects, and these defects are particularly perceptible in large cities where coal has to be carried sometimes to considerable distances from the yard. Wherever more than one ton have to be delivered in the same house, and to the same party a cart or wagon may be used which takes two or more tons at a time, but when a number of tons have to be delivered in the same house, or in the same neighborhood to different parties, it is necessary with the present arrangement to supply a cart for each ton or to return to the yard for every fresh ton to be delivered. And as each cart requires a separate horse and man this arrangement involves much expense in stock and a considerable loss of time. In order to overcome these difficulties I have arranged my cart with two compartments each capable of taking one ton of coal, and each furnished with a separate door in the rear so that when the cart has been backed up to the sidewalk, each compartment can be discharged independent from the other. The bottom of the cart is brought in an inclined position by means of a suitable standard when the draft pole is in a horizontal position or nearly so, and its front end is turned up so that the contents of each compartment run out without tipping the cart, or without any other exertion or labor, as soon as the doors are raised. To facilitate the loading of the cart I have also constructed that portion of the rear end of the cart which extends beyond the doors in such a manner that it turns down reducing the height to which the coal has to be elevated in order to pass to the inside of one of the compartments.

To enable those skilled in the art to make and use my invention I will proceed to describe it.

The platform, A, of the cart is supported by the axle, C, of the wheels, B, in the usual manner.

D is the draft pole, which is secured to the under side of said platform, and a standard, E, keeps the front end of said platform up, bringing it in an inclined position if the draft pole is kept horizontally or nearly so by a supporting bar, $a$, or by attaching it to the draft animals. The standard, E, may be made adjustable so that the inclination of the platform can be increased or diminished at pleasure. The platform, A, may also be supported by four wheels instead of two, as may be most convenient.

The platform, A, forms the support for the box, F, which is divided into two compartments, $b$ and $c$, by means of a longitudinal partition, $d$, each compartment capable of holding one ton of coal. The bottom of each of these compartments is constructed of a strip of sheet metal, $e$, bent up on the front end so as to form an easy curve, $e'$, and representing a smooth surface from end to end. That side of the box, F, which forms its rear end is divided in three parts, $f$, $g$ and $h$, which are separated by a horizontal strip, $i$. The two parts, $g$ and $h$, form separate doors for the two compartments, $b$ and $c$, and they are hinged to a rod, $j$, that has its bearings in lugs, $k$, fastened to the strip, $i$, so that the same turn upward in order to discharge the contents of the cart. Each of these doors is fastened separately by a spring bar, $l$, that catches into noses, $m$, one on each side of the door, and springs, $n$, prevent said spring bars coming out of the noses spontaneously. The ends of these bars project sufficiently beyond the edges of the box to enable the driver to get hold of them for the purpose of disengaging the same from the noses, $m$, and to leave the doors free to swing open.

The upper part, $f$, of the rear end of the cart forms a trap door that extends over the whole width of the box. It is hinged to the same rod, $j$, that supports the doors, $g$ and $h$, and it turns down leaving that portion of the box above the strip, $i$, open from one side to the other. When this trap door is turned up it is fastened by means of pins, $o$, passing through lugs, $p$, as clearly shown in Figs. 1 and 3. If it is now desired to load the cart, the trap door, f, is turned down and the coal is shoveled into the two compartments, one ton or any other known quantity into each. When loaded the trap door is turned up and fastened and the cart is driven to its place of destination. When arrived there it is backed up on the sidewalk and the doors, g and h, are unfastened and the coal runs out under the influence of its own gravity, and by reason of the inclined position and of the smoothness of the bottoms of the compartments. No coal is allowed to remain in the upper corners of the compartments, said corners being covered over by the curved ends of the sheet metal strips which form the bottoms of the two compartments.

The convenience of my cart and its advantages over ordinary carts used for carrying coal will appear more clearly from an example: Suppose it is desired to deliver two tons of coal to two different parties living a long distance from the yard and in the same or in neighboring houses, one man is enabled to take both tons with my cart, and when arrived at the place of the first party he empties one of his compartments and then drives to the place of the other party in order to deliver the contents of the second compartment. With ordinary carts, on the other hand, it would be necessary either to send two carts each requiring its own driver, or if only one cart is used the driver after having delivered the first ton has to return to the yard for the other ton, traveling twice over the same distance causing a great loss of time. In fact with one of my carts one man is enabled to perform exactly the same amount of work, for which two men would be required with ordinary carts, or to perform which with an ordinary cart it takes one man twice as long time. And it will be easily understood that it causes less expense to keep one of my carts in repair than it does to keep in repair two ordinary carts.

It remains to point out the difference between the construction of my carts and that of other vehicles of a somewhat similar construction. Gravel cars on railroads, for instance, are constructed with two distinct compartments each having an inclined bottom and a separate door. These doors, however, are on the sides of the compartments and the inclination of the bottoms is in the direction of the axle or axles of the wheels, so that the two compartments discharge one on this side and the other on the other side of the track. With such cars the wheels must necessarily be small it being indispensable that the platform of the car extends beyond the wheels on both sides in order to clear the same in discharging the contents of the two compartments. For this reason carts discharging on the sides would be impracticable for common roads, and still more so for the paved streets of a city where large wheels are indispensable in order to overcome more easily the obstructions caused by the roughness of the ground. Furthermore it would be impossible with the discharge on the sides to throw the contents of the cart far enough up on the sidewalk; whereas my cart when backed up to the sidewalk will discharge its contents without scattering any portion of it on the street. From these considerations it becomes obvious that for a coal cart the bottom has to be inclined longitudinally or in the direction at right angles to the axle, and the discharge has to be at the end.

It will be easily understood that instead of dividing the cart into two compartments by increasing its size, room for three or more compartments may be made each capable of carrying one ton of coal.

What I claim as new, and desire to secure by Letters Patent, is:—

1. Arranging the box, F, of a coal cart with two or more compartments, b c, with their bottoms inclined longitudinally or at right angles to the axle, C, each with a separate door, g and h, in the end substantially as and for the purpose described.

2. The arrangement of the trap door, f, in combination with the compartments, b and c, and with the doors, g and h, constructed and operating substantially as and for the purpose specified.

3. Forming the inclined bottoms of the compartments, b and c, with the curved end, e', as and for the purpose described.

RICHD. HECKSCHER.

Witnesses:
J. F. BUCKLEY,
W. HAUFF.